United States Patent
Nishimura et al.

(10) Patent No.: US 8,173,313 B2
(45) Date of Patent: May 8, 2012

(54) METHOD OF STOPPING A SOLID POLYMER TYPE FUEL CELL SYSTEM

(75) Inventors: Katsunori Nishimura, Hitachiota (JP); Jinichi Imahashi, Hitachi (JP); Masahiro Komachiya, Hitachinaka (JP); Ko Takahashi, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 420 days.

(21) Appl. No.: 12/345,460

(22) Filed: Dec. 29, 2008

(65) Prior Publication Data
US 2009/0110971 A1 Apr. 30, 2009

Related U.S. Application Data

(62) Division of application No. 10/927,236, filed on Aug. 27, 2004, now abandoned.

(30) Foreign Application Priority Data

Mar. 19, 2004 (JP) .................................. 2004-079969

(51) Int. Cl.
*H01M 8/04* (2006.01)
(52) U.S. Cl. ......... 429/429; 429/427; 429/443; 429/448
(58) Field of Classification Search .................. 429/427, 429/429, 443, 448; 180/65.3
See application file for complete search history.

(56) References Cited

U.S. PATENT DOCUMENTS

| | | | | |
|---|---|---|---|---|
| 6,186,254 | B1 * | 2/2001 | Mufford et al. | 429/13 |
| 6,514,635 | B2 | 2/2003 | Van Dine et al. | |
| 2004/0072042 | A1 * | 4/2004 | Kim | 429/23 |

FOREIGN PATENT DOCUMENTS

| | | |
|---|---|---|
| JP | 63-181268 | 7/1988 |
| JP | 63-41193 | 8/1988 |
| JP | 06-283187 | 10/1994 |
| JP | 10-144334 | 5/1998 |
| JP | 2004-139950 | 5/2004 |

OTHER PUBLICATIONS

Japanese Official Action dated Aug. 21, 2007, for Application No. 2004-079969.

* cited by examiner

*Primary Examiner* — Barbara Gilliam
*Assistant Examiner* — Zachary Best
(74) *Attorney, Agent, or Firm* — Antonelli, Terry, Stout & Kraus, LLP.

(57) ABSTRACT

A fuel cell system for power generation comprising a solid polymer type fuel cell having a solid polymer electrolyte membrane for separating an anode gas and a cathode gas, a resistor, an inverter, a switch for switching the inverter and the resister with respect to the fuel cell, the switch and the inverter, a supply conduit and discharge conduit for the anode gas and the cathode gas, and a supply vale and a discharge valve. When a molar ratio of the hydrogen contained in the anode gas to oxygen contained in the cathode gas becomes 2/1 or less at the time of the stop of the fuel cell, the supply valve for air is closed.

4 Claims, 2 Drawing Sheets

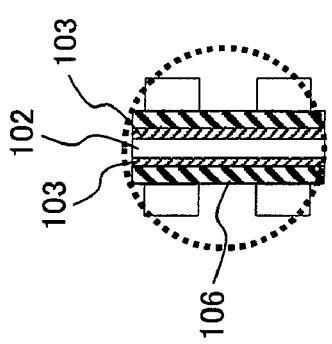
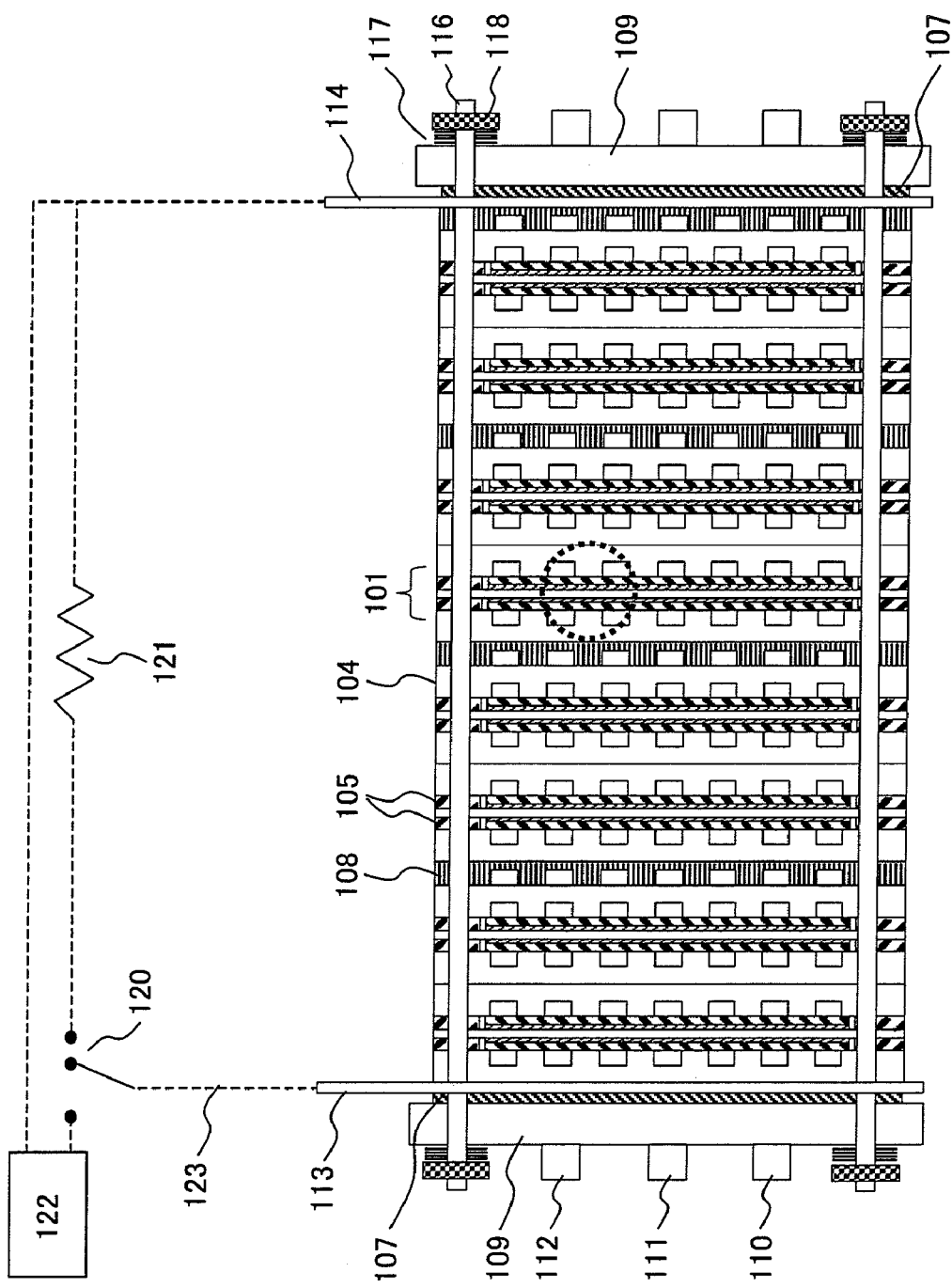
FIG. 1a
FIG. 1b

METHOD OF STOPPING A SOLID POLYMER TYPE FUEL CELL SYSTEM

This application is a Divisional application of application Ser. No. 10/927,236, filed Aug. 27, 2004 now abandoned, the contents of which are incorporated herein by reference in their entirety.

CLAIM OF PRIORITY

The present application claims priority from Japanese application Ser. No. 2004-79969, filed on Mar. 19, 2004, the content of which is hereby incorporated by reference into this application.

FIELD OF THE INVENTION

The present invention relates to a solid polymer type fuel cell system for power generation using a solid polymer type fuel cell capable of stopping without lowering of the performance of the fuel cell.

BACKGROUND OF THE INVENTION

The solid polymer type fuel cell has such features as high output, long service life, less reduction of performance by start and stop, low operation temperature (about 70 to 80° C.), etc. Since the fuel cell has a feature that the start and stop of the fuel cell are easy, the fuel cell is expected to be used in a wide field including a power source of electric cars, distributed business power source, home power sources, etc.

Among the above usages, the distributed power source installing the polymer type fuel cell (such as cogeneration power generation system) produces electric power, and at the same time, heat generated at the time of power generation is recovered as hot water so as to utilize energy effectively. The distributed power source requires a service life of 50,000 hours or more; thus, development of membrane-electrode assemblies, cell structures, power generation conditions, etc has been conducted. As for the total system of the power generation system installing the fuel cell, the lowering of output and power generation efficiency by the repetition of stop and start should be as small as possible is wanted by the users. Particularly, it is known that at the time of sopping of the fuel cell, fuel gas is withdrawn from the fuel cell (burnable gas) so as to prevent lowering of the output voltage. As a relating art, in a phosphoric acid fuel cell system, a technology for stopping the fuel cell was known in which inert gas purge is utilized (Patent Publication 1). In order to save a space for the fuel cell system and downsize the system, a system that does not use the inert gas is desired. A method of stopping the solid polymer type fuel cell using a resister for short-circuiting the outer circuit is disclosed (Patent Publication 2).

When the fuel cell system installing the solid polymer fuel cell is stopped, there may be a case where a drop of output takes place by repeating start-stop of the system, i.e. start and stop of the solid polymer fuel cell, depending on a condition. Particularly, at the time of stopping the fuel cell, if the fuel cell voltage is maintained at 0.8 volt per unit cell or higher under a high temperature state, sintering of catalyst takes place to gather catalyst particles thereby to decrease an active surface area and lower a fuel cell voltage (Patent Publication 1). In order to avoid the problem, it is necessary to remove hydrogen and oxygen remaining in the fuel cell. According to the conventional technology, a method is disclosed wherein inert gas is supplied to the anode and cathode, and a short-circuiting the outer circuit by connecting a dummy resister and each of the cells is employed to stop the fuel cell.

As another system, there is a method wherein a switch for connecting a resister and the fuel cell is operated in accordance with an amount of air during an amount of air to be supplied to the cathode is not zero or in accordance with a output voltage of the fuel cell after the amount of air becomes zero. In the method, since oxygen of the cathode gives a larger affect on the fuel cell than does fuel, i.e. hydrogen, the control is done for stopping the fuel cell in considering only the amount of air.

Patent Publication 1; Japanese Patent Laid-open Hei 10-144334

Patent Publication 2; Japanese Patent Publication Shou 63-181268

SUMMARY OF THE INVENTION

It is an object of the invention to provide a fuel cell system for power generation capable of stopping the fuel cell without deteriorating fuel cell performance and without use of inert gas.

The present invention provides a fuel cell system comprising a solid polymer type fuel cell having a solid polymer electrolyte membrane for separating anode gas and cathode gas, a resister, an inverter, a cable for connecting among the fuel cell, the switch and the inverter, a supply conduit and discharge conduit for anode gas and cathode gas with respect to the fuel cell, and a supply valve and discharge valve connected to each of the supply conduit and discharge conduit respectively, wherein at the time of stopping the fuel cell, the supply vale of the anode gas is closed, and the supply valve of air to the fuel cell is closed when a molar ratio of hydrogen to oxygen contained in the anode gas and the cathode gas separated by the solid polymer membrane is 2/1 or less.

According to the stopping method of the present invention, it is possible to prevent lowering of the performance of the solid polymer type fuel cell. Further, it is possible to omit the inert gas equipment; it is possible to remove hydrogen in the fuel cell at the time of stopping of the fuel cell, by a method of controlling the supply valve of the cathode gas within a prescribed time so as to avoid increase of pressure in the fuel cells with a simple resister.

BRIEF DESCRIPTION OF THE DRAWINGS

FIG. 1 shows a diagrammatic sectional view of a solid polymer type fuel cell system according to the present invention.

DETAILED DESCRIPTION OF THE PREFERRED EMBODIMENTS

Figure 2:
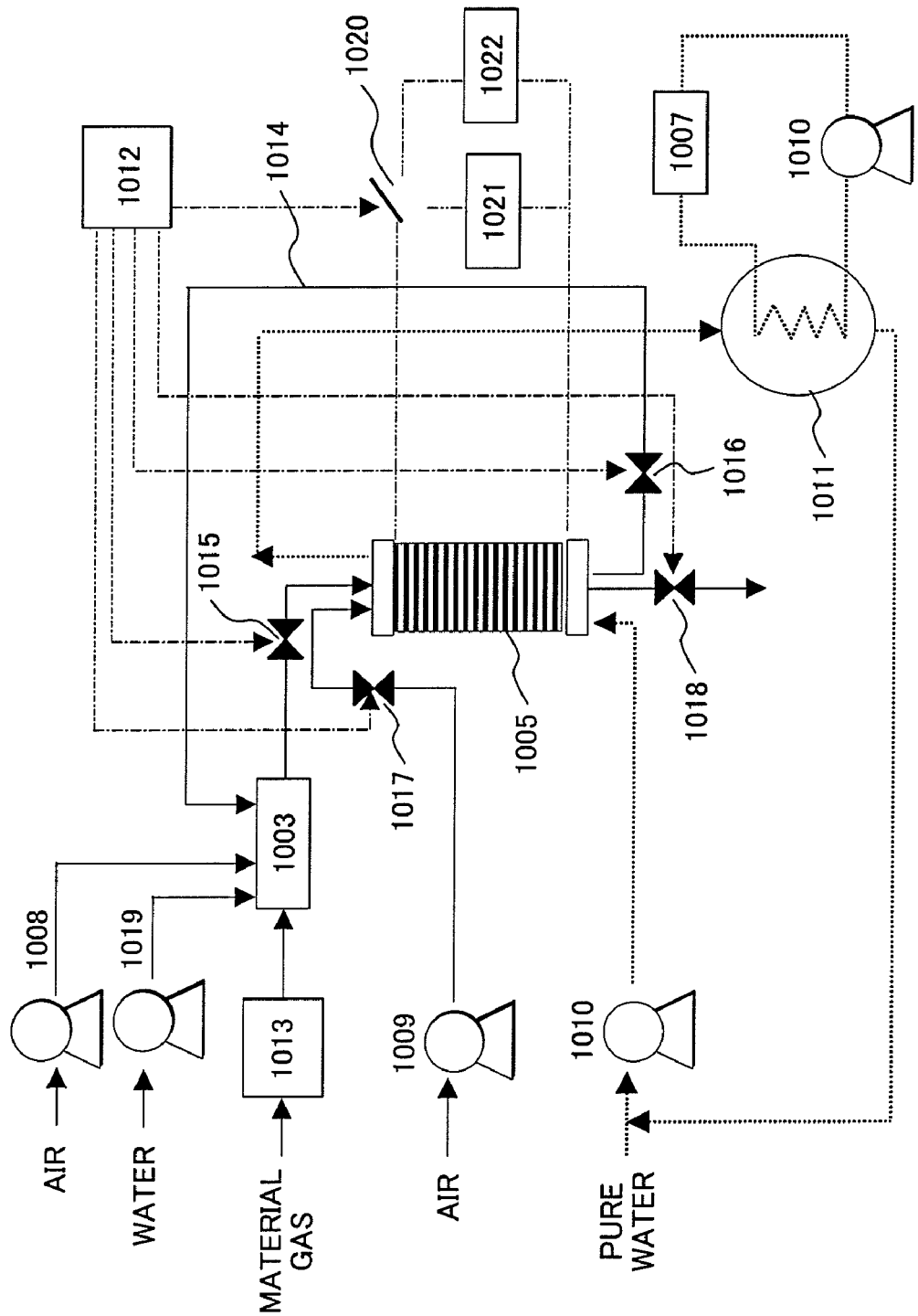
FIG. 2 shows a diagrammatic view of a power generation system installing the solid polymer type fuel cell according to the present invention.

As an example of the fuel cell system of the present invention, there is a fuel cell system provided with a control device for closing a supply valve to the fuel cell.

As another example, there is a control device for controlling the resister in such a manner that before the supply valve and discharge valve of hydrogen gas are closed, the solid polymer type fuel cell and the resister are connected so as to take out the outer current flowing through the resister thereby to oxidize hydrogen in the anode gas.

As still another example, there is provided a fuel cell system provided with a control device having a function to close the supply valve and discharge valve of the cathode gas after the supply valve and the supply valve of the anode gas are closed.

According to the present invention, there is provided a power generation system comprising a solid polymer type fuel cell having a solid polymer electrolyte membrane for separating anode gas and cathode gas, a resister, an inverter, an electrical connection between the fuel cell and the inverter, a switch for switching the electrical connection between the fuel cell and the resister, a supply conduit and discharge conduit for anode gas with respect to the fuel cell, and a supply conduit and discharge conduit for cathode gas with respect to the fuel cell, a supply valve and discharge vale connected to the supply conduit and discharge conduit respectively, wherein at the time of stopping the fuel cell, the supply valve of the anode gas is closed, and the supply valve of air to the fuel cell is closed when a molar ratio of hydrogen contained in the anode gas and to oxygen contained in the cathode gas separated from the anode gas by the solid polymer membrane is 2/1 or less. According to the above embodiment, the connection and switching between the fuel cell and the inverter and between the fuel cell and the resister are specified.

Further, there is provided a power generation system comprising a solid polymer type fuel cell having a solid polymer electrolyte membrane for separating anode gas from cathode gas, a resister, an inverter, a switch for switching an electrical connection between the fuel cell and the resister, a supply valve and discharge valve connected to the supply conduit and discharge conduit respectively, wherein at the time of stopping the fuel cell, the supply vale of the anode gas is closed, and the supply valve of air to the fuel cell is closed when a molar ratio of hydrogen contained in the anode gas to oxygen contained in the cathode gas separated from the anode gas by the solid polymer membrane is 2/1 or less. According to this embodiment, there may be a plurality of switches, and a switch for the resister and the fuel cell and a switch for the inverter and the fuel cell are disposed separately for connecting and separating them.

Still as another example of the present invention, there is provided a power generation system comprising a solid polymer type fuel cell having a solid polymer electrolyte membrane for separating anode gas and cathode gas, a resister, an inverter, an electrical connection between the fuel cell and the inverter, a switch for switching the electrical connection between the fuel cell and the resister, a supply conduit and discharge conduit for anode gas with respect to the fuel cell, and a supply conduit and discharge conduit for cathode gas with respect to the fuel cell, a supply valve and discharge valve connected to the supply conduit and discharge conduit respectively, wherein at the time of stopping the fuel cell, the supply valve of the anode gas is closed, and the supply valve of air to the fuel cell is closed when a molar ratio of hydrogen contained in the anode gas to oxygen contained in the cathode gas separated from the anode gas by the solid polymer membrane is a predetermined value or less. In these embodiments, the timing of closing the valves is set to a specific value of a hydrogen/oxygen molar ratio, that is, a preferable value of the molar ratio is around 1/2, and particularly, a most preferable range is within a range of 1/2 molar ratio ±10%.

In the following, the inventive concept and features of the present invention will be explained by an example of a stopping of the fuel cell stack, wherein a pressure difference between the cathode and the anode being calculated when the stack was stopped, and wherein air supply to the cathode is stopped after the fuel gas supply is stopped to the anode of the stack from a fuel reformer.

In stopping supply of fuel gas, the fuel gas supply valve and discharge valve that are disposed before and after the fuel cell stack are closed. A volume of the fuel gas Va confined by the valves and the number Ma of moles of hydrogen are expressed by the equations (1) and (2).

$$Va = Aas + Aal \quad (1)$$

$$Ma = Ca \cdot Pai \cdot Va/RT \quad (2)$$

In the above equations, Vas is a volume of fuel gas in the stack, Val is a volume of a conduit connecting the valve and the stack, Ca is a concentration of hydrogen contained in a reformed gas (molar fraction unit), Pai is a pressure of fuel gas (at an inlet of the stack), R is the gas constant, and T is a temperature at the time of stopping of the stack. The temperature of the conduit and stack may be different; the sum of the moles of hydrogen calculated in the conduit and the stack at respective temperatures is the moles of hydrogen, in a strict meaning. In this calculation, the temperatures of the conduit and the stack are regarded as the same. The gas pressure (Pai) is a value which is subtracted by the partial pressure of hydrogen; the pressures used in the following are the same.

When the fuel cell system is switched to the stopping mode, the fuel cell system is normally in a power generation mode. Thus, the first step for the stopping mode wherein current supplied to the inverter from the stack is switched to the resister, before stopping of the gas supply. According to this method, it is possible to avoid a gas shortage operation.

Then, after a gas supply valve to the stack is closed, the gas discharge valve is closed. If hydrogen is consumed by current through the resister, the pressure Paf of hydrogen that is almost completely consumed is calculated by the following equation (3).

$$Paf = Pai \cdot (1 - Ca) \quad (3)$$

On the other hand, supposing that air is continuously supplied to the cathode, if the flow amount is unchanged, the cathode pressure becomes constant. In case of a solid polymer type fuel cell which is operated under a normal pressure (hereinafter referred to as a normal pressure type solid polymer fuel cell), the gas pressures at anode and cathode are higher than the atmospheric pressure (100 kPa) by about several kPa to 10 kPa, because there is a pressure loss in the conduits, etc. Therefore, just before the time of closing the anode gas conduit to the stack, the pressure Pci of the cathode gas is calculated by the equation (4).

$$Pci = Pai \quad (4)$$

According to this state, a pressure difference ΔP between the anode side and the cathode side after the conduit valve is closed and hydrogen is consumed by the resister, is obtained by the equation (5) from the relationship between equation (3) and equation (4). Thus, the anode becomes a negative pressure.

$$\Delta P = Pci - Paf = -Pci \cdot Ca \quad (5)$$

When power generation is conducted at 70° C., and when the hydrogen concentration in the reformed gas is 0.55 (indicated as a molar fraction) and Pci is 70 kPa (except for water vapor pressure at 70° C.), it is apparent that a pressure difference which is 40% higher than the atmospheric pressure is applied to the electrolyte membrane. If the hydrogen concentration in the reformed gas becomes lower, the pressure difference tends to become smaller, and there is a limit to lowering the hydrogen concentration, when considering the efficiency of power generation. Accordingly, as shown in the result in this model, it is difficult to avoid the high pressure difference between the electrolyte membrane, if the anode gas is fed continuously. If such the high pressure difference is generated, an excess pressure is applied from the cathode side of the electrolyte membrane to the anode side, which causes deformation of the membrane (expansion), insufficient contact between the electrode and the separator, insufficient sealing at the seal portions (gas cross flow, etc). As a result, the voltage of the stack decreases and the service life of the fuel cell may be shortened.

Then, a method of stopping the fuel cell will be explained wherein a pressure difference is made smaller than a predetermined pressure difference $\Delta Pm$, which is set in considering the allowable pressure difference of the electrolyte membrane and the allowable pressure difference at the sealing portion of the gasket.

In order to remove hydrogen by the resister thereby to make the pressure difference of the equation (5), the cathode gas (air) supply is stopped at a prescribed time Tm, and the conduit valves before and after the stack should be closed as similarly to the anode gas. The limit value Tm can be determined by the following concept.

The volume Vc of the cathode gas confined by the conduit valves before and after the stack and the molar number Mc of oxygen are calculated by the equations (6) and (7).

$$Vc = Vcs + Vcl \tag{6}$$

$$Mc = Cc \cdot Pci \cdot Vc/RT \tag{7}$$

In the above equations, Vcs is a cathode gas volume of an inner volume of the stack, Vcl is a volume of a conduit connecting between the valve and stack, Cc is a concentration (molar fraction unit) of oxygen contained in the cathode gas, and Pci is a pressure of the cathode gas (at the stack inlet). If the cathode gas is air, the oxygen concentration (Cc) is 0.211 (molar fraction unit) when non-humidified air is used. However, in case of humidified air, the concentration is calculated by considering the presence of steam.

Further, when hydrogen is consumed in stoichiometric relation by current flowing through the resister (equation (8A), equation (9B)), the minimum necessary molar number Mc of oxygen is calculated by the equation (9).

$$H_2 \rightarrow 2H^+ + 2e^- \tag{8A}$$

$$2H^+ + \tfrac{1}{2}O_2 + 2e^- \rightarrow H_2O \tag{8B}$$

$$Ma = 2Mc \tag{9}$$

In the above equations, when a double amount of molar number Mc of oxygen necessary for oxidation of hydrogen is smaller than the molar number Ma of hydrogen, it is possible to remove hydrogen in the stack even if the conduit valve of the cathode gas is closed at the same time of closing the conduit valve of the anode gas.

Contrary to the above, when the double amount of the molar number Ma of hydrogen is larger than the molar number Mc of oxygen, the cathode gas is fed to the stack until the molar number of hydrogen becomes 2 Mc or less, so that hydrogen is oxidized by the resister. After closing the conduit valve of the anode gas, the resister connection time Tmin for the time until the molar number Ma of hydrogen becomes 2 Mc will become a value that satisfies the equation (10), if quantity of electricity Q for hydrogen-oxidation is given by the equations (2) and (11). That is, hydrogen is oxidized (equations (8A), (8B)) until the molar ratio of hydrogen and oxygen becomes a value whereby hydrogen and oxygen are consumed in stoichiometric relation, thereafter, the conduit valve of the cathode gas can be closed.

$$2F \cdot (Ma - 2Mc) = Q(Tmin) \tag{10}$$

$$Q(Tmin) = \int V/Rd \, dt \tag{11}$$

In the above equations, V is a voltage of the stack, which is normally a function of time and Rd is a resistance value of the resister. The right side of the equation (11) is a time integral value until Tmin for current flowing when the resister and an outer terminal of the stack are connected. In the present invention, the resistance value Rd of the resister may be a fixed value or a variable value. When such a method for suddenly switching to the stopping mode during the power generation is employed, the values Ma, Mc should be corrected to values that are freed from an amounts of the consumed gases at the time of switching.

The pressure Pa (Tmin) of the anode gas that reaches at the time of Tmin is given by the equation (12).

$$Pa(Tmin) = Pai \cdot Ca \cdot [Ma - (Ma - 2Mc)]/Ma = 2Pai \cdot Ca \cdot Mc/Ma \tag{12}$$

Supposing that the pressure of the cathode gas is a certain value before the switching to the stopping mode, the pressure of the cathode becomes the predetermined value (equation 13).

$$Pc(Tmin) = Pc(Tmin) - Pa(Tmin) = Pci - 2Pai \cdot Ca \cdot Mc/Ma \tag{13}$$

From the equations (12), (13), the pressure difference $\Delta AP$ between the anode and cathode is given by the equation (14).

$$\Delta P(Tmin) = Pci(Tmin) - Pa(Tmin) = Pci - 2Pai \cdot Ca \cdot Mc/Ma \tag{14}$$

In the above equation, supposing that Pci and Pai are approximately equal, the equation (14) can be simplified as equation (15).

$$\Delta P(Tmin) = Pci(1 - 2Ca \cdot Mc/Ma) \tag{15}$$

When the cathode conduit valve is closed simultaneously at the time of Tmin, oxidation of hydrogen by outer short circuiting by the resister is continued, then the pressure difference $\Delta Pf$ is given by the equation (16) after the residual hydrogen and oxygen in the air are completely consumed in accordance with equations (8A), (8B).

$$\Delta Pf = Pcf - Paf = Pci \cdot (1 - Cc) - Pai \cdot (1 - Ca) \tag{16}$$

In case of the normal pressure solid polymer type fuel cell, since the gas pressure is around atmospheric pressure, the equation (16) is simplified as follows, supposing that Pci and Pai are same.

$$\Delta Pf = Pci \cdot (Ca - Cc) \tag{17}$$

Normally, since the concentration Ca of hydrogen in the anode gas is larger than the oxygen concentration Cc, i.e. Ca>Cc. Thus, the equation (17) becomes a positive value. In other words, the pressure at the cathode side is higher than that of the anode side. For example, the right side of the equation (17) becomes 30 kPa, when the pressure of the cathode is 70% (70 kPa) of the atmospheric pressure. The concentration of hydrogen is 0.55 (molar fraction), and a concentration of oxygen is 0.15 under the condition of the saturated steam of 70° C. This value is 5% smaller than the calculated value by the equation (5). Therefore, the pressure difference between the anode and cathode can be lowered by the method of the present invention, and it is possible to decrease the pressure load on the electrolyte membrane.

After elapse of time Tmin prescribed by the equations (10), (11), hydrogen at the anode side is consumed (equation 8A, 8B) by current flowing through the resister when the conduit valve of cathode gas is closed. At this time, there is a point of timing for closing the conduit valve of cathode gas. As the time elapses from Tmin, there is a tendency that the pressure difference between the anode and cathode increases. Thus, it is necessary to close the conduit valve of the cathode as soon as possible, after Tmin calculated by equations (10), (11).

An allowance of the time delay depends on mechanical strength of the electrolyte membrane used in the stack, sealing performance of the gasket, etc, and it is difficult to determine univocally. That is, although the best condition is to close the conduit valve of the cathode at Tmin, the allowance time for closing the valve depends on electrolyte membrane used in the stack.

In the present invention, it is necessary to close the conduit valve of the cathode before ending oxidation of hydrogen by means of the resister, and also it is necessary to close the conduit valve of the cathode before ending oxidation of hydrogen by outer short-circuiting. According to this operation, it is possible to reduce the pressure difference between the anode and cathode, which is larger than that of the case where cathode gas is simply supplied.

It is preferable to make automatic stopping of the power generation system by controlling opening and closing of the valves of the anode gas and cathode gas and by switching of the connection between outer terminals of the resister and the stack using a microcomputer 1012.

In the above, explained is a method of operating opening and closing of the valves in accordance with Tmin. As another method, there is a method wherein pressure sensors are disposed at the conduit near the stack and at the middle point of the cathode conduit, and the pressures at the inlet and outlet of the stack are monitored so that the opening and closing of the valves are controlled.

For example, the quantity of electricity flowing through the resister is acquired by the equation (10), provided that the gas flow amount and the hydrogen concentration are given. At this time, since hydrogen and oxygen react with each other in a stoichiometric relation in accordance with the equations (8A), (8B), it is possible to calculate a pressure corresponding to that of a molar ratio of 2:1 of the moles of hydrogen to the mole of oxygen remaining in the stack. The timing is monitored by the pressure sensors, and when the pressures reach the predetermined values, the cathode valve is closed thereby to lower the pressure difference between the cathode side and the anode side.

The method of the present invention makes it unnecessary to return anode gas to the reformer at the time of stopping, whereby the solid polymer type fuel cell can be stopped independently of the operation condition of the reformer. Further, by closing the valve at the discharge side of gas, it is possible to prevent the electrolyte membrane from drying and from entering of contaminants into the fuel cell, which contributes to prevention of deterioration of the fuel cell.

When the system of the solid polymer type fuel cell is operated, there is a case where flow amounts of anode gas and cathode gas are controlled in accordance with a quantity of power generation (loading rate). In such the case, it is possible to set a closing timing of the gas supply and a timing of switching to the resister by acquiring Tmin by the similar calculation.

Further, although the content of the present invention has been explained by means of the normal pressure solid polymer type fuel cell, the present invention is not limited to the above example. That is, if the time for stopping the conduit valves at the inlet and outlet of the cathode gas is determined by the equations (10), (11), the present invention can be applied to a type of a solid polymer type fuel cell wherein at least one of anode gas and cathode gas is pressurized to a pressure higher than an atmospheric pressure.

The present invention will be explained by reference to embodiments. The present invention will not be limited to the embodiments.

Embodiment 1

A fuel cell structure to which the present invention is applied is shown in FIG. 1(a), and (b). FIG. 1(a) shows a schematic view of the fuel cell system of the present invention, and FIG. 1(b) shows an enlarged view of the portion indicated by a circle in FIG. 1(a).

The power generation section is a unit cell 101; normally several tens of unit cell are stacked to take out direct current from the fuel cell. In this embodiment, 80 unit cells are stacked. Each of the unit cells is constituted by a membrane-electrode assembly (the assembly consisting of membranes 102 and 103 in FIG. 1(b) and two separators 104). The separators sandwich the assembly and gas diffusion layers 106. Separator 108 is inserted between the separators 104. A gasket 105 was inserted between the separators. One side of the separator has grooves through which fuel gas passes. In the other separator, there are grooves through which oxidizing gas, normally air passes. The separators and assembly are stacked, and a positive electrode collector 113 and a negative electrode collector 114 are disposed on both ends. The stacked assembly is pressurized from the collectors 113, 114 by end plates 109 through insulating plates 107. Parts for fixing the end plates 109 are bolt 116, plate spring 117, and nut 118.

The stopping method according to the present invention is carried out by a switch 120 and the resister 121 connected in the middle of a load cable 123 connected to the electrode collectors 113, 114 of the stack. At the time of normal power generation, the switch 120 is connected to the inverter side 122, thereby to supply direct current power to the inverter 122 from the stack. At the time of stopping mode, the switch 120 is changed to the resister 121, thereby to flow an outer short circuit current.

FIG. 2 shows a diagrammatic view of a power generation system using a solid polymer type fuel cell system according to the present invention. Raw gas is city gas supplied for reformed gas. The city gas is supplied through a pre-filter 1013 to the reformer 1003. Air and water necessary for producing the reformed gas are supplied by pumps 1008, 1019. The hydrogen concentration in the reformed gas was 70% (dry base). The anode gas to be supplied to stack 1005 was produced by the reformer 1003; the anode gas was fed through a supply conduit having an anode gas supply valve 1015.

Cathode gas drives an air supply pump (blower) 1009, and is supplied to the stack through a conduit having a cathode gas supply valve 1017. After power generation at the stack, anode gas is returned through a conduit having a discharge valve 1016 to the reformer 1003 through a pipe 1014, thereby to utilize it to maintain the temperature of the reforming catalyst. Air is discharged from a conduit having a cathode gas discharge valve 1018 to the atmosphere. Pure water is supplied by a pump 1010 to the stack in order to cool heat from the stack and to recover heat. Water discharged from the stack transfers its heat to water stored in the water storage tank 1007, to be circulated to the stack by a pump 1010. The water stored in the tank is circulated by the pump 1010 through a heat exchanger 1011.

In the present invention, there is provided a mechanism for operating the anode gas supply valve 1015, discharge valve 1016, cathode gas supply valve 1017, and discharge valve 1018.

A stack stopping operation was conducted from the rated power generation condition of the stack to the stopping mode. At first, an instruction was issued by the microcomputer 1022 to connect the opening-closing switch 1020 with the resister 1021 to make current flowing through the inverter 1022 zero. Then, the supply valve 1015 of the anode gas was stopped, and the supply of hydrogen to the stack 1005 was shutdown. Thereafter, the discharge valve 1016 of the anode was closed to shutdown the anode gas in the stack.

The supply of the cathode gas was continued until Tmin which is obtained by the equation (10), then the blower 1009 was immediately stopped, and the supply valve 1017 was closed, followed by closing the valve 1018.

The resister 1021 should preferably be a variable resister, and the initial resistance was so set that current equivalent to 1 A flows with respect to the open circuit voltage (Vo) of the stack. That is, in this embodiment, since Vo was 79 to 80 V, the initial resistance value (Ro) was set to 80 Ω. Although the stack voltage decreases by outer short-circuiting as the time elapses, the resistance was increased when the stack voltage became 50% (40V) of the open circuit voltage Vo so as to keep 40 BV of the voltage between the collectors 113 and 114.

The outer short-circuiting time was set to 15 minutes. After the elapse of the time, the switch 120 was held in such a condition that the switch was not connected to the inverter side, nor to the resister side; then, the main power source of the system was off.

The series of the operations were carried out by controlling with a microcomputer 1012. In this embodiment, Tmin was 30 seconds. The displacement time between the time at which the anode gas discharge valve was closed and the time at which the cathode valve was closed was 10 seconds. Again, the power generation system was started, and power generation test under rated conditions was conducted, and the stop mode operation was conducted. After the start and stop operation was repeated 100 times; the output voltage of the stack input in the inverter 1022 was 50 V of the initial value at the rated conditions and after the 100 time repletion test, the output voltage was 59.9 V.

Embodiment 2

Using the power generation system assembled in the embodiment 1, the delay time between the anode discharge valve and cathode discharge valve was set to 20 seconds, 30 seconds, 60 seconds and 5 minutes by varying a parameter of the microcomputer. The repetition test of 100 times was carried out for each of the delay time. As a result, the voltages after the test were 59.7 to 59.9 V in cases of the delay time of 30 seconds and 60 seconds, while the initial voltage was 50 V. In case where the delay time was 20 seconds, hydrogen remained in the stack, and the voltage after the test lowered to 59.3 V. In case of the 5 minutes delay time, the voltage lowered to 59.2 V. In considering Tmin (30 seconds) obtained in the embodiment 1, when the delay time is set to a certain time (20 seconds), which is shorter than Tmin, hydrogen was incompletely oxidized in the stack; when the delay time is set to another time, which is ten times (5 minutes) Tmin, the cathode gas pressure became higher than the anode gas pressure when hydrogen is oxidized. Therefore, it was revealed that the voltage drop became large in any cases.

Embodiment 3

A T-pipe was disposed at a pipe or conduit between the anode gas supply valve 1015 and the stack 1005 in the power generation system of embodiment 1 to install a pressure sensor. The measuring signals from the pressure sensor are taken into the microcomputer 1012; in accordance with the pressure signals, opening and closing of the anode gas valve 1015 is controlled. This pressure is defined as an anode entrance pressure.

Similarly, a T-pipes and pressure sensors are disposed at the pipe or conduit between the anode gas discharge valve 1016 and the stack 1005 and at pipe or conduit between the cathode gas discharge valve 1018 and the stack 1005. Each of the signals is taken into the microcomputer 1012 to control each of opening and closing of the valves. Respective pressures are defined as the anode gas outlet pressure, cathode entrance pressure, and cathode outlet pressure.

The anode entrance pressure is a sum of the pressure loss in the stack and the anode exit pressure when a load current is zero, i.e. hydrogen is not consumed. In this embodiment, since this pressure loss is as small as 3 kPa, an amount (mole number) of hydrogen present in a space confined by the anode supply valve and the anode discharge valve was calculated, on the supposition that the average number of the pressure loss and the outlet pressure is a pressure of anode gas in the stack.

Similarly, an amount (mole number) of oxygen present in a space confined by the cathode supply valve and the cathode discharge valve was calculated, on the supposition that an average of the cathode entrance pressure and the cathode outlet pressure is a cathode gas pressure. In the present system, since the oxygen concentration in air is about 20% with respect to the hydrogen concentration (about 70%) in the reformed gas, the above-mentioned residual oxygen amount is smaller than ½ the residual hydrogen amount when the load current is zero. Accordingly, oxygen will be short unless hydrogen is consumed to at least Tmin (30 seconds) obtained in embodiment 1 by outer short-circuiting with the resister in a condition that the anode conduit valves 1015 and 1016 are closed and air is continuously fed.

Thus, in the present system, the anode entrance pressure is determined when Tmin is 30 seconds, and the value is memorized in the microcomputer 1012; when the anode entrance pressure reaches the above value, the microcomputer controls so that the cathode supply valve 1017 and the cathode discharge valve 1018 are closed.

The judgment of the end of stopping mode is made when the pressure difference between the anode side and the cathode side reaches a predetermined value (40 k Pa). That is, when the conduit valve 1015, 1016, 1017, 1018 are closed, the anode entrance pressure and the anode outlet pressure, and the cathode entrance pressure and the cathode outlet pressure coincide each other;, thus it was possible to judge that hydrogen was almost completely consumed.

Except that the valves are opened and closed in accordance with the result of measurement of pressures, the power generation test was conducted under the rated conditions and under the same conditions as those in embodiment 1, and the stopping mode operation was conducted. The start-stop operation was repeated 100 times; as a result, the output voltage of the stack input in the inverter 1022 was 59.8 V, while the initial value under the rated conditions was 50 V. The pressure control method of this embodiment gives almost the same output stability as in embodiment 1.

According to the embodiments of the present invention, it is possible to provide a method of stopping a fuel cell, which eliminates the use of inert gas. Further, it is possible to provide a method of stopping a fuel cell, which is capable of preventing the degradation of the catalyst that is caused by hydrogen remaining in the anode and oxygen in the cathode thereby to form a high voltage state of the cells. Further, it is also possible to provide a method of stopping a fuel cell, which is capable of preventing voltage drop caused by problems such as deformation and strength decrease of electrolyte membranes, decrease in sealing performance, etc. The problems may be caused by a decrease in a gas volume confined in the fuel cell that leads to an excessively pressure difference in the membrane-electrode assemblies when short-circuit current flows into the outer resister connected to the fuel cell.

What is claimed is:

1. A method of stopping a fuel cell system comprising a solid polymer fuel cell having a solid polymer membrane for separating anode gas and cathode gas, a resistor connected to cables, one of which is connected to a current collector of a cathode or an anode, and the other is connected to an inverter, a switch for switching selectively electrical connection between the fuel cell and the inverter or between the fuel cell and the resistor, an anode gas supply valve and an anode gas discharge valve, a cathode gas supply valve, a cathode gas discharge valve, and a computer for controlling the supply valves and discharge valves, which comprises switching on one of the resistor or the inverter and the fuel cell to cause electric current generated in the fuel cell to be consumed by the resistor or the inverter until a molar ratio of hydrogen to oxygen in the fuel cell system becomes 2/1 or less, closing the supply valve for the anode gas for a time integral value until Tmin, determined by $2F \cdot (Ma-2Mc) = Q(Tmin)$ and $Q(Tmin) = \int V/Rd \, dt$, Ma being the molar number of hydrogen, Mc being the molar number of oxygen, F being Faraday's number, V being a voltage of the fuel cell system, Rd being a resistance value of the resistor, Tmin being the resistor connection time after closing the supply valve for the anode gas, and Q being quantity of electricity for hydrogen oxidation, for current flowing when the resistor and an output terminal of the fuel cell system are connected, and then, closing the cathode gas supply valve to the fuel cell when a molar ratio of the hydrogen contained in the anode gas to oxygen contained in the cathode gas becomes a molar ratio of hydrogen to oxygen to be less than 2/1 to thereby make an output of the fuel cell zero.

2. The method according to claim 1, which further comprises connecting the solid polymer fuel cell and the resistor before the supply valve and the discharge valve of the anode gas are closed, thereby to cause outer current to flow through the resistor which consumes electricity generated by reaction of the hydrogen and oxygen contained in the anode gas and the cathode gas.

3. The method according to claim 1, which further comprises closing the supply valve and discharge valve for the cathode gas after the supply valve and the discharge valve for the anode gas are closed.

4. The method according to claim 1, wherein said switching switches on the resistor, and wherein the cathode gas supply valve to the fuel cell is closed before ending oxidation of hydrogen in the fuel cell with the switch having selectively switched to the resistor.

* * * * *